INVENTORS
BURTON A. NOBLE
ALBERT F. UHLIG
BY
ATTORNEYS

INVENTORS
BURTON A. NOBLE
ALBERT F. UHLIG
BY
ATTORNEYS

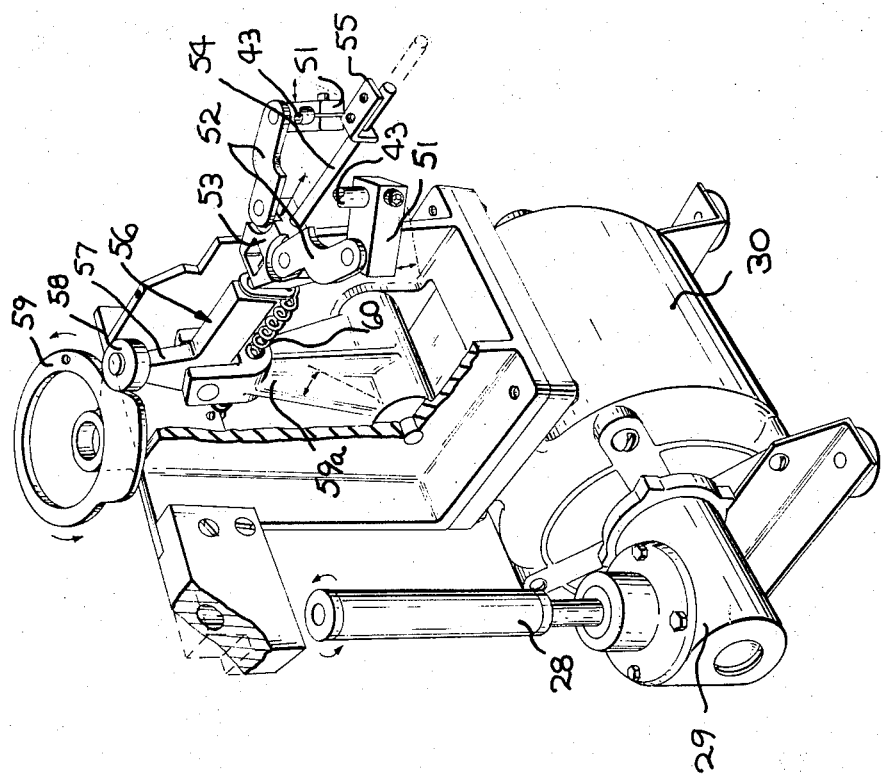
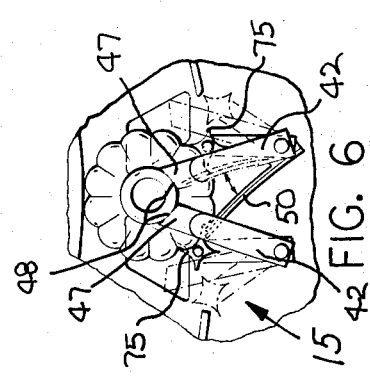

Dec. 5, 1967   B. A. NOBLE ET AL   3,356,203
CONTAINER HANDLING AND INSPECTING APPARATUS
Filed Dec. 29, 1966   5 Sheets-Sheet 5

INVENTORS
BURTON A. NOBLE
ALBERT F. UHLIG
BY
ATTORNEYS

United States Patent Office 3,356,203
Patented Dec. 5, 1967

3,356,203
CONTAINER HANDLING AND INSPECTING APPARATUS
Burton A. Noble, San Leandro, and Albert F. Uhlig, Oakland, Calif., assignors to Owens-Illinois, Inc., a corporation of Ohio
Filed Dec. 29, 1966, Ser. No. 605,652
21 Claims. (Cl. 198—33)

This invention relates to a container handling and inspecting apparatus.

In the patent to Uhlig 3,101,848 there is disclosed and claimed a container handling apparatus wherein containers are moved along an arcuate horizontal floor and rotated at an inspecting station along said floor by a single means in the form of a continuously driven belt and the articles are held in position for inspection at the inspection station by means which rotatably hold the articles at the inspection station.

Among the objects of this invention are to provide an apparatus of the type shown in the Uhlig patent which is more efficient and involves less maintenance; which includes improved means for interrupting the advance of containers along the floor to the inspection station while a preceding article is being tested; improved means for rotatably holding the article upright at the station; and improved means for insuring the positive movement of the articles to and from the inspection station.

Basically, the apparatus shown herein is of the type shown in the Uhlig patent. The means for interrupting the movement of the articles comprises a lever that is pivoted intermediate its ends and has one end in engagement with a cam and the other end formed with spaced article engaging portions that interrupt and hold the containers away from the inspection station. The means for rotatably holding the container at the inspection station comprises a lever that is pivoted about a horizontal axis at its lower end and has a cam follower pivoted to its upper end. The cam follower includes a vertical arm which engages a cam and a horizontal arm the motion of which is utilized to operate arms that engage the sides of the container and hold it against the continuously moving belt at the inspection station. Some of the arms are equipped with rollers. Others of the arms have tapered ends for engaging the neck of the container in the case of a narrow neck container. One of the arms comprises a plurality of superimposed flexible members which are fixed at one end and have their other ends engaging the container for yieldingly positioning the container into inspection position and out of inspection position.

Figure 1:
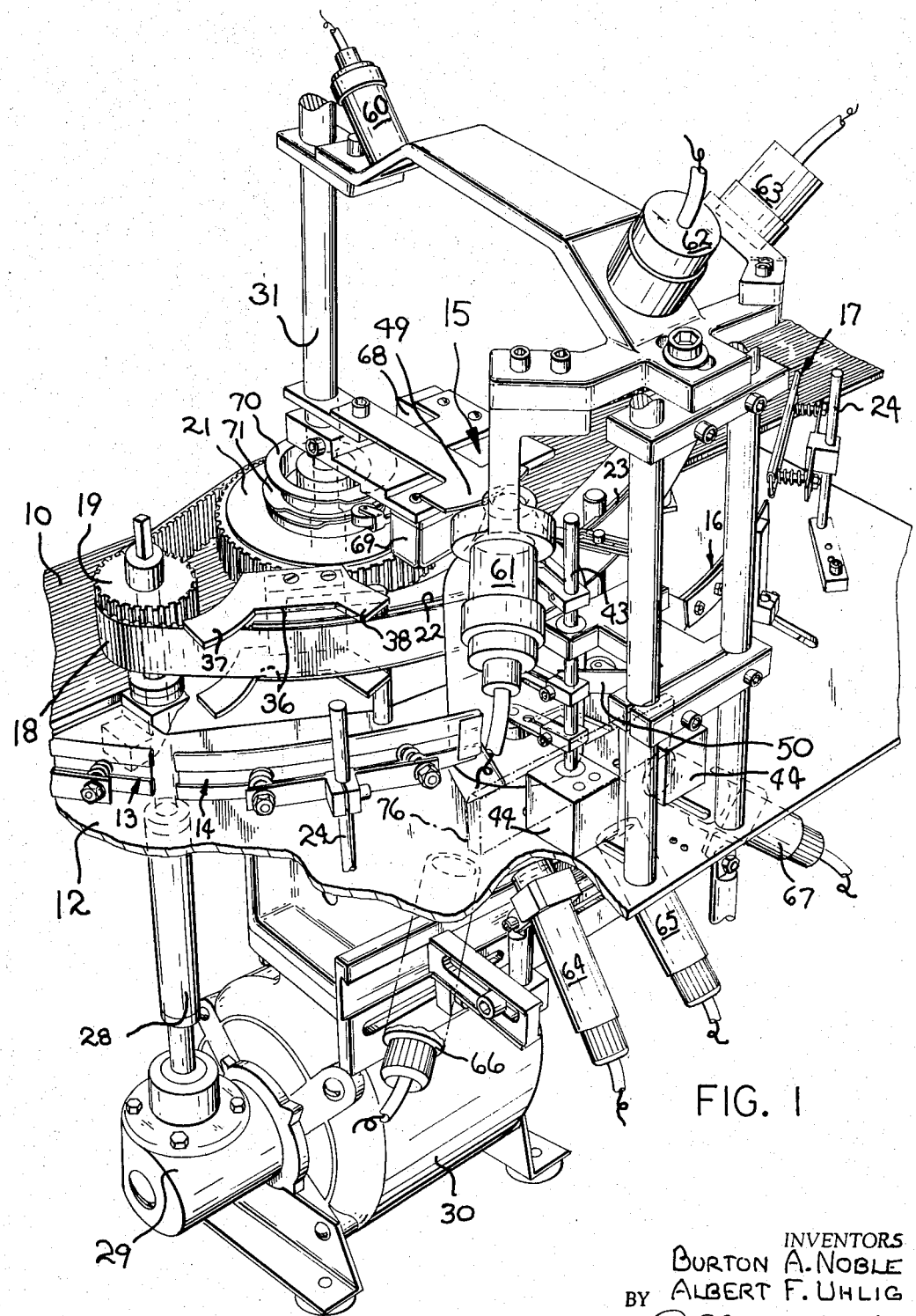
Figure 2:
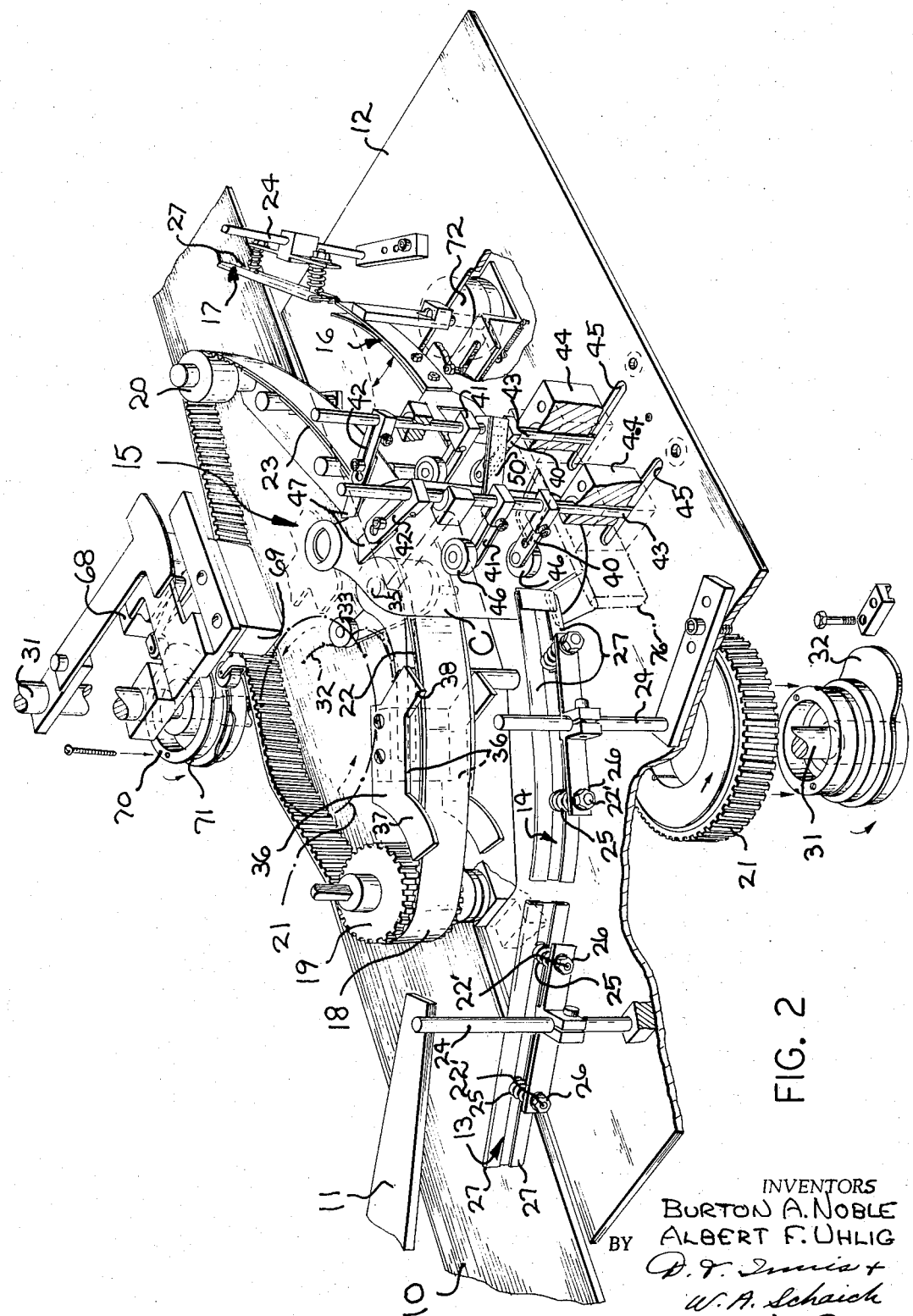
Figure 3:
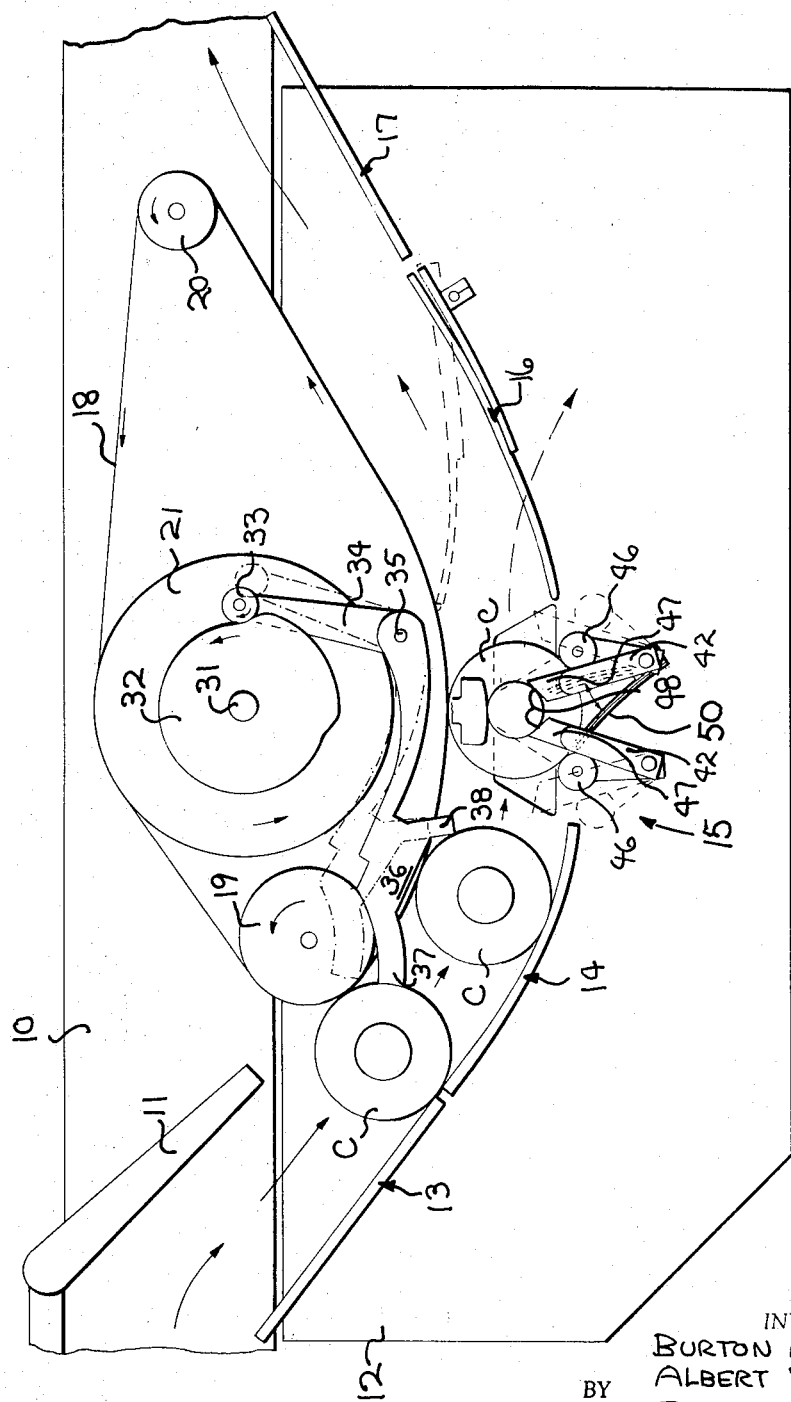
Figure 5:
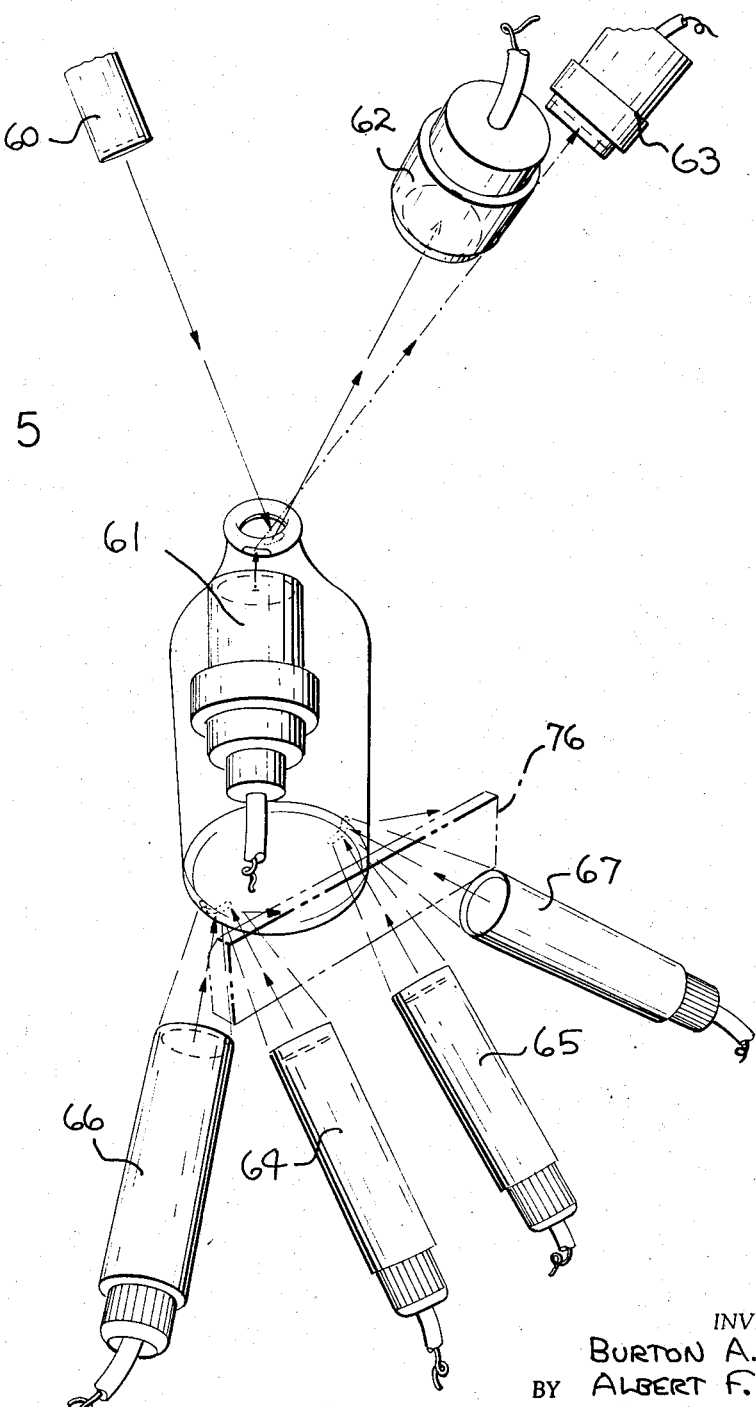

In the drawings:
FIG. 1 is a fragmentary part sectional perspective view of an apparatus embodying the invention.
FIG. 2 is a view similar to FIG. 1, parts being broken away and parts being shown in exploded position.
FIG. 3 is a partly diagrammatic plan view of the apparatus.
FIG. 4 is a fragmentary perspective view of a portion of the apparatus.
FIG. 5 is a partly diagrammatic perspective view showing the manner in which various inspecting light beams and light sensitive cells are positioned at the inspecting station.
FIG. 6 is a fragmentary view of a modified form of the invention.

Referring to FIGS. 1–3, the article handling and inspecting apparatus is shown as positioned adjacent a horizontal conveyor 10 which is driven continuously in a manner not shown. The articles C, which may comprise glass containers that have been freshly formed, are carried by the conveyor 10 and deflected by a switch arm 11 onto the floor or plate 12 of the apparatus which extends horizontally. The containers C are guided by rails 13, 14 to an inspection station 15 where they are rotated in position for inspection. After inspection the containers are guided by rails 16, 17 back onto the conveyor 10. In the event that the containers do not pass inspection, the rail 16 is pivoted to the dotted line position shown in FIG. 3 to deflect the container out of the aforementioned path so that the container is rejected.

Containers are moved along the path to and away from the inspection station and are rotated at the inspection station by an endless toothed belt 18 which is trained over a toothed drive pulley 19, plain idler pulley 20 and a toothed driven pulley 21. Backup members 22, 23 are provided along the path of the containers. Each of the rails 13, 14 and 17 is yieldingly supported and urged toward the belt by an arrangement which includes bolts 22' on each rail which are fixed at one end and extend through brackets 23 that are adjustably mounted on vertical posts 24. A spring 25 is telescoped over each bolt 22' and compressed between the rail and bracket 23 by a nut 26 threaded on the other end of each bolt. In order to facilitate the movement of the containers, and to prevent steel and glass contact plastic strips 27 are provided on the edges of the rails 13, 14 and 17.

As shown in FIG. 1, the drive pulley 19 is fixed on the upper end of a flexible coupling 28 which extends from a gear unit 29 which in turn is driven by a motor 30. The driven pulley 21 rotates freely on a shaft 31 and rotation thereof operates cams, as presently described, to actuate the article interrupting means and the article holding means.

The article interrupting means functions to release the containers one at a time so that each one enters the inspection station in time to be controlled smoothly and accurately by the article holding means at the inspection station. Specifically, a cam 32 is fixed on the pulley 21 and is engaged by a roller 33 on one end of an arm 34 that is pivoted intermediate its ends as at 35 about a vertical axis. The other end of the lever 34 supports vertically spaced brackets 36 that define spaced article engaging portions 37, 38 which are adapted to be swung into and out of the path of the containers C. As the cam 32 is rotated, the lever 34 is swung from the solid to the broken line position shown in FIG. 3 bringing the portions 37, 38 out of the path of the containers. As shown in FIG. 3, the portions 37, 38 function to hold one of the containers therebetween out of the inspection station and the remaining containers rearwardly. When the lever is swung to the broken line position, the container that was held between the portions 37, 38 is permitted to be moved by engagement with the belt 18 to the inspection station while the succeeding container is permitted to move into position such that when the portions 37, 38 are moved to the solid line position, the succeeding container is retained therebetween. A spring, not shown, yieldingly holds the cam follower roller 33 against the cam 32.

The article holding means at the inspection station functions to smoothly and accurately move the container and hold it against the belt for rotation by the belt and inspection. Specifically, the means for holding each container against the belt 18 at the inspection station in stable position for rotation and inspection comprises a plurality of bars or cradle arms 40, 41, 42 which are fixed on the upper ends of the posts 43 which in turn are journalled for rotation in blocks 44. The blocks 44 are adjustably mounted on the floor or plate 12 for movement toward and away from the containers. The lower ends of the posts 43 extend downwardly through elongated slots 45 in the floor 12. Arms 40, 41 support rollers 46 that are adapted to engage the sides of the container when the arms are swung inwardly toward one another. The arms 42 support members 47 of a low friction material such as nylon which are swung inwardly to engage the neck of the container as shown in FIGS. 2 and 3. The ends of the members 47 are tapered as at 48. As shown in FIG. 1, an arcuate plastic stop member or bar 49 is provided adjacent the upper end of the container and serves as a stabilizer against which the upper end of the container is moved by the members 47.

The post 43 nearest the exit from the inspection station supports a plurality of leaves 50 of flexible material such as plastic which are fixed at one end and have their free ends extending toward the oncoming container and adapted to engage the container. As a container enters the inspection station with the cradle arms open, it contacts the leaves 50 which provide a flexible cushioning effect to gently retard bottle travel. As the cradle arms close, the ejector 50 moves toward the container which is gently moved into the inspection station. When the cradle arms are nearly closed, the flexible leaves 50 snap over the center of the bottle leaving it completely free to rotate; controlled only by the drive belt, cradle rollers, and neck stabilizer members 47 and plastic stop 49. As the cradle arms start to open after the inspection, the ejector leaves 50 again contact the container and force builds up in the leaves 50 as the cradle opens. This force tends to move the container out of the inspection station but the cradle rollers on the exit side will hold back the container until there is enough clearance between the rollers and the drive belt for the container to pass through. At this instant the leaves 50 straighten out and snap the container into the delivery drive.

The specific apparatus for moving the cradle arms comprises cradle levers 51 that are fixed to the lower ends of the posts 43. Links 52 are pivoted at one end to the levers 51 and at the other end to a cross head 53. The cross head 53 is in turn fixed to a cross shaft 54 that has one end thereof guided by a bracket 55 and the other end thereof fixed to a cam follower 56. The cam follower 56 includes a horizontal arm that is fastened to the shaft 54 and a vertical arm 57 that carries a roller 58 engaging a cam 59. The cam follower bracket 56 is pivoted to the upper end of a lever 59a which in turn is pivoted at its lower end about a horizontal axis. A spring 60 extends between the shaft 54 and the frame of the machine to yieldingly urge the cam follower roller 58 against the cam 59. By this arrangement the cam roller 58 remains vertical at all times and in the same horizontal plane as the cam 59. Cam 59 is fastened to driven pulley 21.

Referring to FIG. 5, at the inspection station the container is inspected for defects, in the case of the glass container, in the neck and in the bottom and heel of the container. Specifically, light beams from sources 60, 61 are directed downwardly and upwardly respectively against the neck of the container and focused into spots in the neck of the container. If a defect is present as the container is rotated, a portion of the beam is reflected, as shown by the broken lines, to light sensitive cells 62, 63. Simultaneously light beams from sources 64, 65 are focused in spots on the heel and bottom of the container and light beams from sources 66, 67 are focused in spots on the heel of the container. If a defect is present, a portion of a beam is reflected to light sensitive solar cell 76 in the form of an elongated plate positioned on its edge with the sensitive surface facing the container at the inspection position to create a reject signal.

In order to prevent a false signal and insure that the reject signal will be permitted only during inspection, appropriate switches 68, 69 operated by cams 70, 71 on the driven pulley 21 are provided. The circuit associated with such switches does not form a part of the present invention and is therefore not specifically shown herein. If one of the light sensitive cells is energized during the inspection, a signal is formed by a circuit not shown to actuate a rotary solenoid 72 that rotates the gate 16 to deflect the container from its arcuate path and thereby reject it.

In the form of the invention shown in FIG. 6, the containers are fluted or non-circular in horizontal cross section and to accommodate these containers the rollers 75 are multi-faceted or non-circular.

We claim:

1. In an article handling and inspecting apparatus comprising a generally arcuate horizontal floor extending between inlet and exit ends of the apparatus, an inspection station between said ends, means for rotatably holding articles upright one at a time at said station, means for both advancing articles in succession along said floor to said station and rotating them while being held at said station, means operating in timed relation to actuation of the article holding means for interrupting advance of articles along the floor to said station while a preceding article is being tested, and cam control means for actuating both the article holding means and the article advance interrupting means, the improvement wherein said article interrupting means comprises
a lever pivoted intermediate its ends,
one end of said lever being operated by said cam means and the other end of said lever having spaced article engaging portions whereby when said portions are moved into the path of said articles, one of said articles is retained between said portions out of said station and the remaining articles are interrupted in their movement while when said portions are moved out of the path of said articles, said articles are permitted to be moved by said advancing means toward said station, said means for rotatably holding articles upright one at a time at said station comprising
a lever pivoted adjacent its lower end about a horizontal axis,
a cam follower pivoted about a horizontal axis above the upper end of said lever,
said cam follower having a first arm extending generally vertically and having a portion thereof engaging said cam means,
said cam follower including a second lever extending horizontally,
and means operated by said cam follower for engaging an article at said station and holding said article in position at said station.

2. The combination set forth in claim 1 wherein said last mentioned means comprises a plurality of pairs of arms mounted for swinging movement about spaced vertical axes and swingable from a position out of the path of the containers into a position into the path of the containers for engaging and holding the article therebetween.

3. The combination set forth in claim 2 wherein said arms include members having tapered ends adapted to engage the neck of an article which comprises a container.

4. The combination set forth in claim 3 wherein said members are made of a low friction plastic material.

5. The combination set forth in claim 2 wherein said last mentioned means comprises a plurality of superposed flexible members fixed at one end and adapted to engage the article for yieldingly urging the article into and out of position for inspection.

6. The combination set forth in claim 5 wherein said last mentioned members are mounted for swinging movement about a vertical axis under the action of said cam means.

7. The combination set forth in claim 2 wherein at least some of said arms have rollers thereon.

8. The combination set forth in claim 2 wherein at least some of said arms have multi-faceted rollers thereon for engaging the sides of an article that is non-circular in cross section.

9. In an article handling and inspecting apparatus comprising a generally arcuate horizontal floor extending between inlet and exit ends of the apparatus, an inspection station between said ends, means for rotatably holding articles upright one at a time at said station, endless belt means for both advancing articles in succession along said floor to said station and rotating them while being held at said station, means operating in timed relation to actuation of the article holding means for interrupting advance of articles along the floor to said station while a preceding article is being tested, and cam control means for actuating both the article holding means and the article advance interrupting means, the improvement wherein, said article interrupting means comprises
a lever pivoted intermediate its ends,
one end of said lever being operated by said cam means and the other end of said lever having spaced article engaging portions whereby when said portions are moved into the path of said articles, one of said articles is retained between said portions out of said station and the remaining articles are interrupted in their movement while when said portions are moved out of the path of said articles, said articles are permitted to be moved by said advancing means toward said station,
said means for rotatably holding articles upright one at a time at said station comprising
a lever pivoted adjacent its lower end about a horizontal axis,
a cam follower pivoted about a horizontal axis above the upper end of said lever,
said cam follower having a first arm extending generally vertically and having a portion thereof engaging said cam means,
said cam follower including a second lever extending horizontally,
and means operated by said cam fnllower for engaging an article at said station and holding said article in position at said station.

10. The combination set forth in claim 9 wherein said last mentioned means comprises a plurality of pairs of arms mounted for swinging movement about spaced vertical axes and swingable from a position out of the path of the containers into a position into the path of the containers for engaging and holding the article therebetween.

11. The combination set forth in claim 10 wherein said arms include members having tapered ends adapted to engage the neck of an article which comprises a container.

12. The combination set forth in claim 11 wherein said members are made of a low friction plastic material.

13. The combination set forth in claim 12 wherein said last mentioned means comprises a plurality of superposed flexible members fixed at one end and adapted to engage the article for yieldingly urging the article into position for inspection.

14. The combination set forth in claim 13 wherein said last-mentioned members are mounted for swinging movement about the vertical axis under the action of said cam means.

15. The combination set forth in claim 10 wherein at least some of said articles have rollers thereon.

16. The combination set forth in claim 10 wherein at least some of said arms have multi-faceted rollers thereon for engaging the sides of an article that is non-circular in cross section.

17. In an article handling and inspecting apparatus comprising a generally arcuate horizontal floor extending between inlet and exit ends of the apparatus, an inspection station between said ends, means for rotatably holding articles upright one at a time at said station, means for both advancing articles in succession along said floor to said station and rotating them while being held at said station, means operating in timed relation to actuation of the article holding means for interrupting advance of articles along the floor to said station while a preceding article is being tested, and cam control means for actuating both the article holding means and the article advance interrupting means, the improvement wherein said means for rotatably holding articles upright one at a time at said station comprising
a lever pivoted adjacent its lower end about a horizontal axis,
a cam follower pivoted about a horizontal axis above the upper end of said lever,
said cam follower having a first arm extending generally vertically and having a portion thereof engaging said cam means,
said cam follower including a second lever extending horizontally,
and means operated by said cam follower for engaging an article at said station and holding said article in position at said station.

18. The combination set forth in claim 16 wherein said last mentioned means comprises a plurality of pairs of arms mounted for swinging movement about spaced vertical axes and swingable from a position out of the path of the containers into a position into the path of the containers for engaging and holding the article therebetween.

19. The combination set forth in claim 17 wherein said arms include members having tapered ends adapted to engage the neck of an article which comprises a container.

20. The combination set forth in claim 17 wherein said last mentioned means comprises a plurality of superposed flexible members fixed at one end and adapted to engage the article for yieldingly urging the article into and out of position for inspection.

21. In an article handling and inspecting apparatus comprising a generally arcuate horizontal floor extending between inlet and exit ends of the apparatus, an inspection station between said ends, means for rotatably holding articles upright one at a time at said station, means for both advancing articles in succession along said floor to said station and rotating them while being held at said station, means operating in timed relation to actuation of the article holding means for interrupting advance of articles along the floor to said station while a preceding article is being tested, and cam control means for actuating both the article holding means and the article advance interrupting means, the improvement wherein
said means for rotatably holding articles upright one at a time at said station comprising
a plurality of pairs of cradle arms movable toward and away from the article,
and a plurality of superimposed flexible members fixed at one end and adapted to engage the article for yieldingly urging the article into and out of position for inspection.

References Cited

FOREIGN PATENTS 968,887    5/1958    Germany.

EVON C. BLUNK, *Primary Examiner.*

M. L. AJEMAN, *Assistant Examiner.*